United States Patent
Gorilovskij et al.

(10) Patent No.: US 9,571,798 B2
(45) Date of Patent: Feb. 14, 2017

(54) DEVICE FOR DISPLAYING THE SITUATION OUTSIDE A BUILDING WITH A LIFT

(76) Inventors: Aleksej Alekseevich Gorilovskij, St. Petersburg (RU); Dmitrij Alekseevich Gorilovskij, St. Petersburg (RU)

( * ) Notice: Subject to any disclaimer, the term of this patent is extended or adjusted under 35 U.S.C. 154(b) by 1037 days.

(21) Appl. No.: 12/908,863

(22) Filed: Oct. 20, 2010

(65) Prior Publication Data

US 2011/0199488 A1 Aug. 18, 2011

Related U.S. Application Data

(63) Continuation of application No. PCT/RU2009/000334, filed on Jun. 26, 2009.

(30) Foreign Application Priority Data

Jul. 1, 2008 (RU) .................................. 2008129287

(51) Int. Cl.
*H04N 7/18* (2006.01)
(52) U.S. Cl.
CPC ................ *H04N 7/181* (2013.01); *H04N 7/18* (2013.01)
(58) Field of Classification Search
CPC ........ H04N 7/186; H04N 7/181; H04M 11/025
(Continued)

(56) References Cited

U.S. PATENT DOCUMENTS 5,923,363 A * 7/1999 Elberbaum .................. 348/156
2003/0210209 A1 * 11/2003 Lagarrigue et al. .......... 345/1.3
(Continued)

*Primary Examiner* — Andy Rao
(74) *Attorney, Agent, or Firm* — Saul Ewing LLP

(57) ABSTRACT

This device is for additional elevator equipment and may, among other things, be used for elevators in hotels, business and exhibition centers, retail complexes, etc. This device for monitoring exteriors of elevator-equipped buildings includes a number of video cameras positioned on the outer wall along the vertical span of the building, a display screen in the elevator car, a controller, an elevator position indicator and a multiplexer. Controller output is fed directly into the monitor. The output socket of the multiplexer is connected to the first input socket of the controller whose second input socket is connected to the output socket of the elevator position indicator. The device contains at least one set of additional video cameras positioned outside the building, at different heights elsewhere on the premises. Feed cables from the first, second . . . $n^{th}$ video cameras installed on the outer wall of the building are connected, respectively, to the $1^{st}, 2^{nd} \ldots n^{th}$ input sockets of a commutation switch; feed cables from the $1^{st}, 2^{nd}, \ldots 1n^{th}$ additional cameras are connected, respectively, to the $11^{th}, 12^{th}, \ldots 1n^{th}$ input sockets of the commutation switch, whose output socket is connected to the input socket of a multiplexer. In this fashion, the exterior of the building where the elevator is located can be monitored through cameras installed at a distance from the building itself.

17 Claims, 1 Drawing Sheet

(58) Field of Classification Search
USPC .................................................. 348/142–160
See application file for complete search history.

(56) References Cited

U.S. PATENT DOCUMENTS

2010/0157049 A1* 6/2010 Dvir et al. .................... 348/143
2013/0188055 A1* 7/2013 Gazdzinski ................... 348/159

* cited by examiner

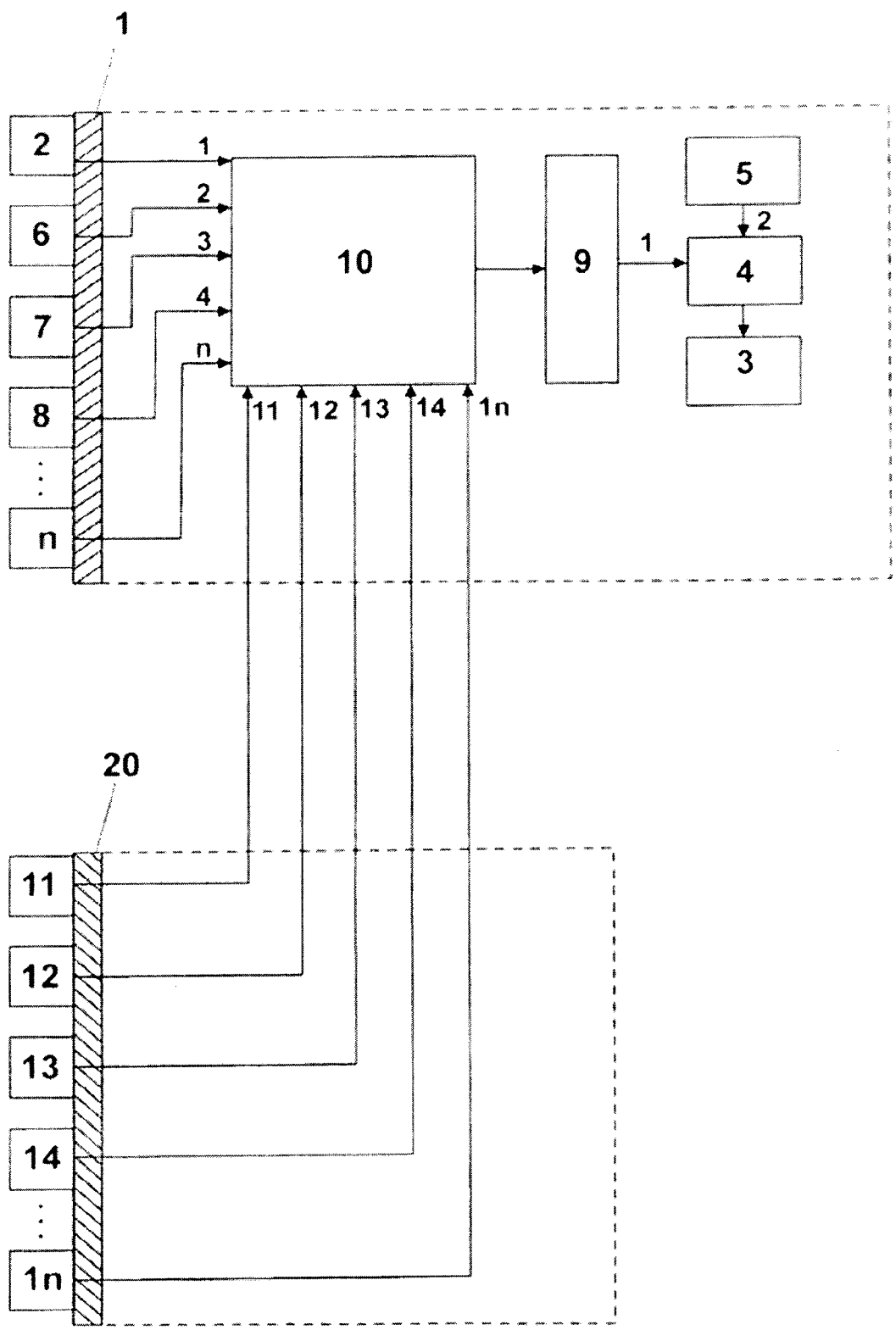

DEVICE FOR DISPLAYING THE SITUATION OUTSIDE A BUILDING WITH A LIFT

RELATED APPLICATIONS

This application is a Continuation of PCT application serial number PCT/RU2009/000334 filed on Jun. 26, 2009 which in turn claims priority to Russian application number RU2008129287 filed Jul. 1, 2008, both of which are incorporated herein by reference in their entirety.

FIELD OF THE INVENTION

This object is for additional elevator equipment and may, among other applications, be used for elevators in hotels, business and exhibition centers, retail complexes, etc.

BACKGROUND OF THE INVENTION

There already exists a device (JP 7081858) that displays different information for elevator passengers, such as date, weather, day of the week and season, and may be used for virtual monitoring of the building's exterior.

This device contains an information generator and an internal monitoring device inside the elevator car.

The drawback of this device is its inability to display the exterior of the building where the elevator is located in real time.

There is yet another well-known device (JP 11079580) for monitoring the exterior of elevator-equipped buildings. It includes one video camera positioned outside the building, a controller, a display screen in the elevator car and an elevator position indicator. Controller output is fed directly into the monitor.

The video camera is attached to the outer wall of the building at mid-floor, so that the camera's lens could move vertically and sideways to allow for monitoring of the building's exterior from the first floor to the top floor.

The drawback of this device is that a single camera (rather than multiple cameras at different floors) installed at a fixed location (in this case, at mid-height of the building) will produce a distorted image on the display as the elevator moves up or down.

Besides, any mechanical devices on the outer wall of the building (the device for moving the lens or the entire video camera) must be maintained against the elements (lubrication, spare part replacement, etc.).

There is yet another well-known device (RU 55756 U1) for monitoring exteriors of elevator-equipped buildings. It includes a video camera positioned outside the building, a display screen in the elevator car, a controller and an elevator position indicator. Controller output is fed directly into the monitor. The device contains one or more additional video cameras positioned along the vertical span of the building and a multiplexer. Feed cables from the cameras are connected, respectively, to the 1st, 2nd, . . . nth input sockets of the multiplexer, which is in turn connected to the first input socket of the controller; the output socket of the elevator position indicator is connected to the second input socket of the controller.

This device is based on the above design.

Using this device, one can monitor the building's exterior from inside the elevator, with video signal being fed in from fixed observation points alongside the vertical span of the building.

However, this device does not allow for monitoring video feeds from observation points located at a distance from the building where the elevator is located.

SUMMARY OF THE INVENTION

The intended purpose of this device is to allow for monitoring video feeds from observation points located at a distance from the building where the elevator is located.

According to this device, the device for monitoring exteriors of elevator-equipped buildings includes a number of video cameras positioned on the outer wall along the vertical span of the building, a display screen in the elevator car, a controller, an elevator position indicator and a multiplexer. Controller output is fed directly into the monitor. The output socket of the multiplexer is connected to the first input socket of the controller whose second input socket is connected to the output socket of the elevator position indicator. The device contains at least one set of additional video cameras positioned outside the building, at different heights elsewhere on the premises, and a commutation switch. Feed cables from the first, second . . . $n^{th}$ video cameras installed on the outer wall of the building are connected, respectively, to the $1^{st}$, $2^{nd}$, . . . $n^{th}$ input sockets of the commutation switch; feed cables from the $1^{st}$, $2^{nd}$, . . . $1n^{th}$ additional cameras are connected, respectively, to the $11^{th}$, $12^{th}$, . . . $1n^{th}$ input sockets of the commutation switch, whose output socket is connected to the input socket of the multiplexer.

The applicant had been unable to identify any existing designs identical to the proposed device, and thus one may conclude that it should satisfy the novelty criterion.

The design of this useful model is illustrated on the diagram below.

BRIEF DESCRIPTION OF THE DRAWINGS

The device for monitoring the exterior of the elevator-equipped Building 1 (the elevator itself is not shown) includes video cameras 2, 6, 7, 8 . . . n positioned on the outer wall of Building 1.

DETAILED DESCRIPTION OF THE PREFERRED EMBODIMENTS

These video cameras are positioned equidistantly (at 3 m intervals) along the vertical span of Building 1. The elevator has Monitor 3 installed inside—a 32" built-in TFT panel by SHARP. The output socket of Controller 4 (Computer Dynamics Nd61400 Pentium4 2.4 GHz, 1024 MP RAM, 40 Gb HDD, operating system Linux 2.6.1) is connected to the input socket of Monitor 3. Elevator Position Indicator 5 (for example, an optical one) is installed in the elevator shaft. The output socket of the indicator is connected to the second input socket of Controller 4. The first input socket of Controller 4 is connected to the input socket of Multiplexer 9, which in this case is an 8-port Ethernet router (D-Link DGS 1008). The device includes at least one (in this case, it is in fact one) set of additional video cameras 11, 12, 13, 14 . . . ln installed outside Building 1 and at some distance therefrom, at various heights throughout Facility 20, which is, essentially, a high-rise. It could also be a different structure, such as a building or a broadcast television tower, etc. The device contains Commutation Switch 10, which in this case is a US-made CISCO-9000 with a wireless interface. In this example, the commutation switch is operated with a remote control unit placed in the elevator.

Output sockets of the $1^{st}$, $2^{nd}$, ... $n^{th}$ video cameras (2, 6, 7, 8, ... n) installed on the outer wall of Building 1 are connected, respectively, to the $1^{st}$, $2^{nd}$, ... $n^{th}$ input sockets of Commutation Switch 10; output sockets of the $1^{st}$, $2^{nd}$, ... $ln^{th}$ video cameras (11, 12, 13, 14 ... ln) positioned throughout Facility 20 are connected, respectively, to the $11^{th}$, $12^{th}$, $13^{th}$, $14^{th}$ ... $ln^{th}$ input sockets of Commutation Switch 10. The output socket of Commutation Switch 10 is connected to the input socket of Multiplexer 9.

In this example, using the remote control (or controls on Commutation Switch 10 itself), one can select one of the two observation regimes, alternating between the feed from video cameras 2, 6, 7, 8 ... n installed on Building 1 and additional video cameras 11, 12, 13, 14 ... ln located throughout the territory of Facility 20.

Video feeds from each selected camera or group of cameras are channeled through Commutation Switch 10 and into Multiplexer 9. Images are sequenced in Multiplexer 9, and the aggregate picture is channeled to Controller 4. Indicator 5 feeds data on the position of the elevator car to Controller 4. As a result, Controller 4 selects the most up to date image from the feed received from Multiplexer 9 and displays the position of the elevator on Monitor 3. Elevator passengers can thus monitor the exterior of elevator-equipped Building 1 in real time as the car moves along, alternating between the feed from fixed observation points on the outer wall of Building 1 or observation points located throughout Facility 20, at a distance from Building 1. Thus, the functionality of this device allows for monitoring and displaying inside the elevator not only video feeds from the cameras installed on the building itself, but also from those positioned at other locations, at a distance from such a building.

This device is factory-made on regular equipment, using off-the-shelf components and materials, which, in this applicant's opinion, satisfies the industrial applicability criterion.

What is claimed is:

1. An apparatus for monitoring exteriors of elevator-equipped buildings comprising a first set of video cameras positioned on an outer wall along a vertical span of a building located in a city, a display screen in an elevator car associated with the building, a controller, an elevator position indicator and a multiplexer;
    wherein the apparatus receives a video feed or feeds from a second set of video cameras that are not on the building but are positioned on a different building at a different location in the city or in another city, and shows on the display screen a view from the different building that is dependent on the height of the elevator.

2. The apparatus of claim 1 in which the second set of cameras are at different heights at a distance from the building and the display screen shows video feeds from different cameras as the height of the elevator changes.

3. The apparatus of claim 1 in which each camera in the set of on-building cameras is positioned at different heights on the outer wall of a building and is operable to provide a video feed for display inside the or each elevator.

4. The apparatus of claim 1 in which a commutation switch sends to the multiplexer signals that inform about images corresponding with views that are perceived by each separate camera and are processed by the commutation switch between the feed from separate video cameras, and all images are respectively linked up to each other in the multiplexer, then a summed image is sent to the controller, wherein the controller output is fed directly into a monitor;
an output socket of the multiplexer is connected to a first input socket of the controller whose second input socket is connected to an output socket of an elevator position indicator; and
outputs of the first and second sets of video cameras are connected respectively with inputs of the commutation switch, and outputs of the commutation switch are connected with inputs of the multiplexer.

5. The apparatus of claim 1 in which the display screen in the or each elevator shows the video feed at a given position from a camera at the height corresponding with the position of the elevator at that time.

6. The apparatus of claim 1 further including an elevator position indicator to indicate a current position of an elevator.

7. System for monitoring the exterior of a building located in a city and equipped with one or more elevators;
    the system including an elevator associated with the building, a display screen inside the elevator and a set of off-building cameras positioned at different heights on a different building at a different location in the city or in another city, with each camera operable to provide a video feed to the display screen inside the elevator that is dependent on the height of the elevator.

8. The system of claim 7 in which the off-building cameras are at different heights and the display screen shows video feeds from different cameras as the height of the elevator changes.

9. The system of claim 7 further comprising an on-building set of cameras positioned at different heights on the building itself, each camera in this on-building set of cameras being operable to provide a video feed for display inside the or each elevator.

10. The system of claim 7 in which the off-building set of cameras are positioned at various heights on a different building.

11. The system of claim 7 in which the off-building set of cameras is located at several different locations distant from the building.

12. The system of claim 7 which multiplexes the video feed from the off-building cameras with the video feed from the on-building set of cameras.

13. The system of claim 7 in which the display screen in the or each elevator shows at a given time the video feed from a camera at the approximate height of that elevator at that time.

14. The system of claim 7 further including an elevator height position indicator.

15. The system of claim 7 comprising:
    (a) feed cables connected from each of the off-building cameras and each of the on-building cameras to a switch;
    (b) a multiplexer receiving the video feeds distributed over the feed cables;
    (c) a display monitor in the or each elevator for displaying the video feeds.

16. The system of claim 7 with a display screen that shows the exterior of the building in which the elevator is located, in which the elevator receives a video feed from a set of off-building cameras positioned at a distance from the building.

17. Method of monitoring the exterior of a building located in a city and equipped with one or more elevators; including the steps of
  (i) providing a video feed from a set of off-building cameras positioned at different heights on a different building at a different location in the city or in another city; and
  (ii) displaying a video feed from a camera from the set of off-building cameras on a display screen inside one or each elevator that is dependent on the height of the elevator.

* * * * *